United States Patent [19]

Schertler

[11] 4,201,241
[45] May 6, 1980

[54] CHECK VALVE WITH REMOVABLE SEAT

[76] Inventor: William E. Schertler, R.R. 1, Red Level, Ala. 36474

[21] Appl. No.: 810,927

[22] Filed: Jun. 29, 1977

[51] Int. Cl.$^2$ ............................................. F16K 15/03
[52] U.S. Cl. ................................... 137/527; 137/454.2
[58] Field of Search ................. 137/527, 527.8, 515.7, 137/527.2, 527.4, 527.6, 454.2, 454.4, 454.5, 454.6

[56] References Cited

U.S. PATENT DOCUMENTS

| | | | |
|---|---|---|---|
| 2,419,318 | 4/1947 | Johnson | 137/527 |
| 2,767,735 | 10/1956 | Darling | 137/527 |
| 3,058,534 | 10/1962 | Keithahn | 137/515.7 X |
| 3,565,107 | 2/1971 | Bunch | 137/515.7 |
| 3,817,277 | 6/1974 | Wheatley | 137/515.7 |
| 3,933,173 | 1/1976 | Kajita | 137/515.7 X |
| 3,990,471 | 11/1976 | Schutzer | 137/527 |
| 4,061,535 | 12/1977 | Nolan et al. | 137/527.8 |

Primary Examiner—William R. Cline
Attorney, Agent, or Firm—Keaty & Garvey

[57] ABSTRACT

A check valve apparatus provides an overall valve body which can be placed in any typical flow line, a removable seat being provided at the inner portion of the valve body, the seat having a center orifice through which fluids can flow. The seat can be attached using a plurality of temporary tensile connectors, and the seat having a recess which receives a valving member therein. The valving member pivots in the seat and is weighted to a degree which aids in closure under static flow conditions. A closure spring can be added to further insure closure of the valve when desirable. In the preferred embodiment, the valving member pivots in the valve seat a distance less than ninety degrees, thus insuring valve closure during back flow conditions, the valving member projecting at least some degree into the line of flow of the fluid stream.

6 Claims, 7 Drawing Figures

CHECK VALVE WITH REMOVABLE SEAT

BACKGROUND OF THE INVENTION

1. Field of the Invention

The present invention relates to check valves and more particularly relates to an improved check valve apparatus wherein the seat portion of the valve is removable and therefore easily replaceable or repairable.

2. General Background of the Prior Art

A check valve is a valve structure which is normally placed in a fluid flow line wherein it is desirable to prevent the flow of fluids in one direction. A check valve will normally retain an open posture when fluid flow is in its proper direction. Upon a reversal of fluid flow, the check valve will effect a closure of the line and thus a stoppage of flow within the line itself in the undesirable direction.

Check valves are known in the art and the below table lists some prior art check valve devices which have been patented.

| PRIOR ART PATENTS | | |
|---|---|---|
| U.S. Pat. No. | Inventors | Issue Date |
| 2,482,198 | J. F. Melichar | Sept. 20, 1949 |
| 3,058,534 | J. D. Keithahn | Oct. 16, 1962 |
| 3,363,645 | S. M. Miller | Jan. 16, 1968 |
| 3,509,908 | R. E. Latham, et al | May 5, 1970 |
| 3,612,097 | D. G. Prince | Oct. 12, 1971 |
| 3,990,471 | G. Schutzer, et al | Nov. 9, 1976 |

General Discussion of the Present Invention

The check valve of the present invention provides an overall valve body which can be placed in a fluid flow line.

The valve body has an opening therein, into which a removable valve seat can be placed and thereafter attached. The seat has a recess portion into which a cooperating valving member is placed. An overall retainer secures the valving member within the recess of the seat, but does not impair its valving action. The retainer provides a stop which prevents the valving member from opening an angle greater than ninety degrees. Thus, the valving member "projects" at least a small distance into the fluid stream which flows through the overall valve structure. In the case of backflow, closure of the valving member is insured.

The removable seat can be provided with a sealing member such as an O-ring on the face which abuts the valve body. The recessed portion of the valve seat which receives the valving member therein is likewise provided with an O-ring or like suitable sealing member to insure a fluid type seal upon closure of the valving member. Both the removable seat and the retainer are provided with a plurality of openings which correspond to openings provided in the valve body, with all the corresponding openings aligning upon assembly of the valve. Mounting bolts or like connectors can be inserted through these openings in order to perfect a rigid connection of the valve body, seat and retainer upon assembly, but allowing the valving member to move and operate as is desirable.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENT

Figure 1:
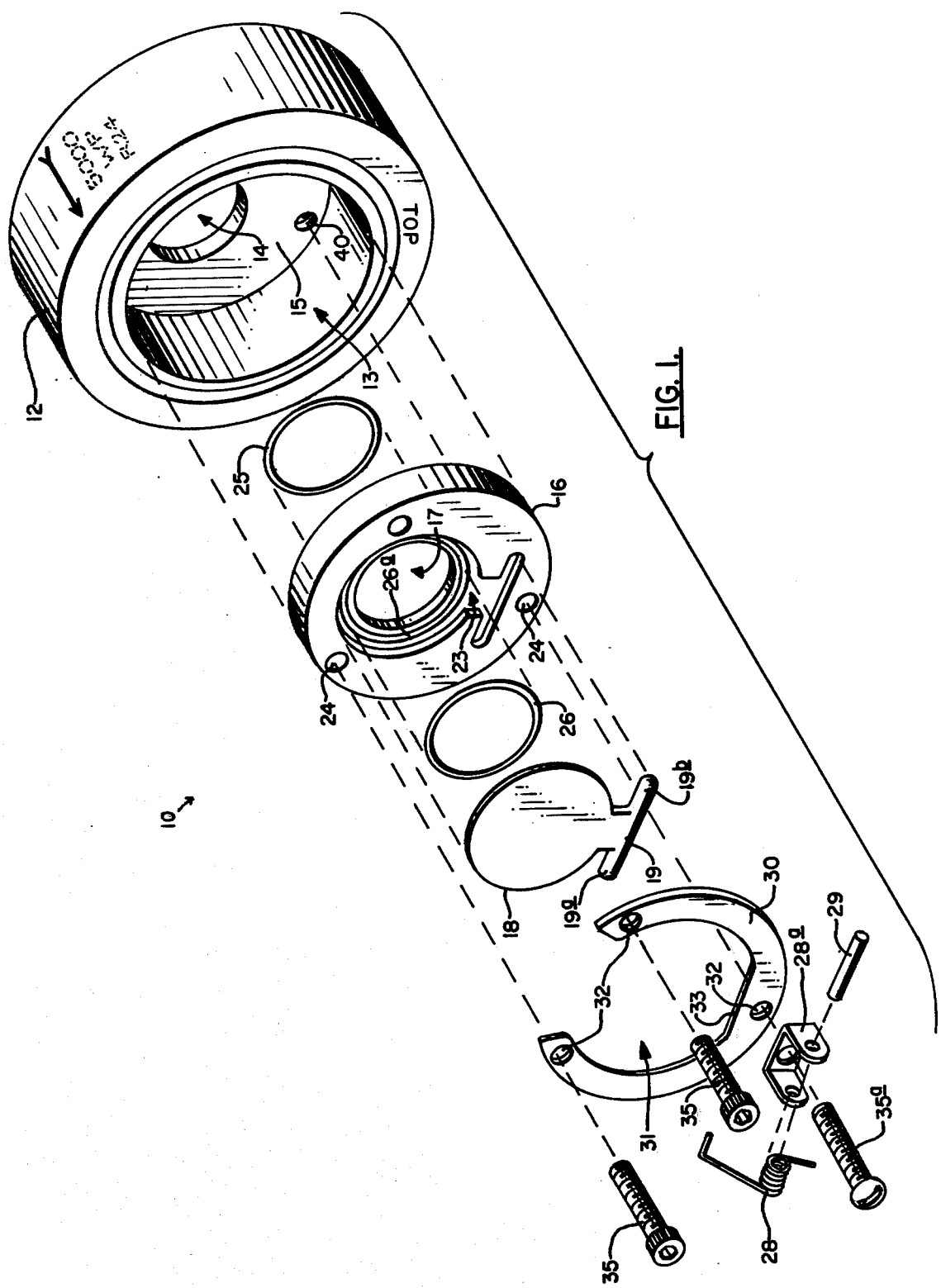
FIG. 1 is a perspective exploded view of the preferred embodiment of the apparatus of the present invention.

The preferred embodiment of the apparatus of the present invention is designated generally by the numeral 10 in FIG. 1. Check valve 10 is comprised generally of a body 12 having a recess 13 therein through which fluid opening 14 is provided in face 15. Recess 13 is so dimensioned as to accomodate removable seat 16 therein. Seat 16 is provided with a recess 23 into which valving member 18 can be operatively placed. The valving member 18 and removable seat 16 are secured within recess 13 of check valve body 12 by means of retainer 30. Seat 16 abuts inner face 15 with O-ring 25 perfecting a seal.

Body 12 can be of any size so as to fit conveniently in existing conventional flow line. Body 12 can be provided with any type of conventional piping connection (e.g., for example, flanged, screwed, bolted, welded and the like) allowing body 12 to be easily and readily placed into an existing pipeline or piping system.

The direction of flow of fluid through valve 12 (see arrow FIG. 1) will be in a direction which would normally hold valving member 18 in an openmost position. An opening 14 is provided in the central portion of body 12 through which the fluid flowing can pass. Opening 14 can be of any desired diameter.

Figure 2:
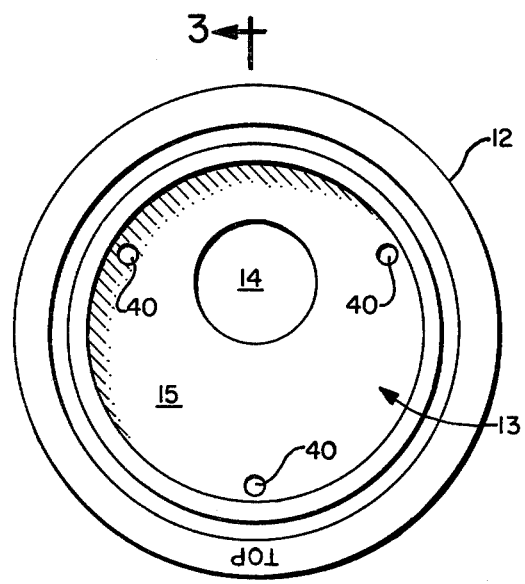
FIG. 2 is a front view of the valve body portion of the preferred embodiment of the present invention.
Figure 3:
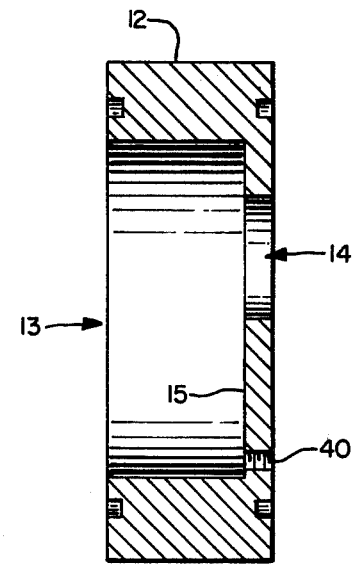
FIG. 3 is a side view of the valve body portion of the preferred embodiment of the apparatus of the present invention.

As can best be seen in FIGS. 2 and 2A, removable seat 16 is provided with an opening 17 which corresponds to the opening 14 in valve body 12. When seat 16 assumes its proper position within body 12, openings 14 and 17 will align as is desirable. Preferably the diameter of opening 14 is slightly smaller, e.g. one-sixteenth of an inch less, than opening 17 in order for the surrounding area of body 12 to absorb the initial wear caused by the abrasive fluid flow, allowing the removable seat 16 to last longer.

Valve body 12 and removable seat 16 are provided with corresponding openings 40, 24 which likewise align, and accomodate mounting bolts 35 as will be explained more fully hereinafter. It should be understood however, that, when holes 24 of removable seat 16 align with holes 22 of valve body 12, likewise openings 14 of body 12 and 17 of seat 16 are coincident and aligned as is desirable.

Removable seat 16 is so dimensioned as to slidably fit and register with recess 13 of valve body 12. The fit of removable seat 16 within recess 13 is a comfortable fit, allowing however, a small amount of tolerance so that it can be easily inserted and removed for example by hand.

Figure 4:
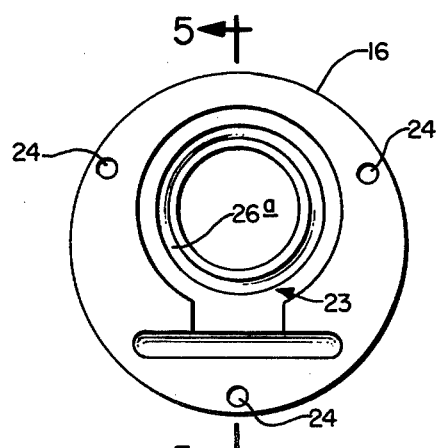
FIG. 4 is a front view illustrating the removable valve seat portion of the preferred embodiment of the apparatus of the present invention.
Figure 5:
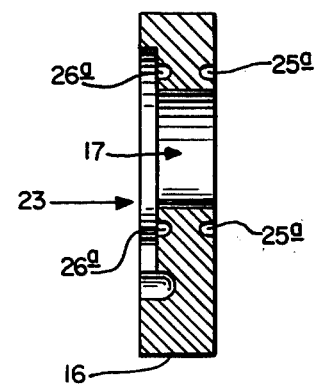
FIG. 5 is a sectional view taken along lines 5—5 of FIG. 4.
Figure 6:
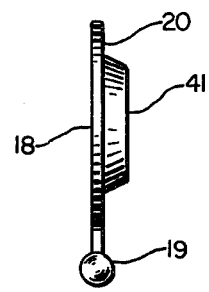
FIG. 6 is a side view of the valving member portion of the preferred embodiment of the apparatus of the present invention.

As can best be seen in FIGS. 2, 4 and 5, the downstream face of removable seat 16 provides a recess 23. Valving member 18 (see FIGS. 4 and 5) exactly registers and fits within recess 23 of removable seat 16. Recess 23 can be provided with an inner O-ring 26 placeable in recess 26a or like seal which receives sealably the closure plate 20 portion of valving member 18.

The central portion of valve closure plate 20 can provide a projection 41 which registers with and inserts into opening 17 of seat 16 when valve member 18 is in a closed position. This projection 41 likewise provides extra weight towards the center portion of the flow line, which urges valving member 18 to close readily during static flow or backflow situations as is desirable.

Figure 7:
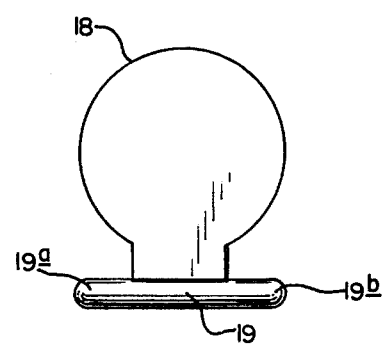
FIG. 7 is a front view of the valving member portion of the preferred embodiment of the apparatus of the present invention.

Valving member 18 provides pivot pin 19 attached to valving member 18 as can best be seen in FIG. 7. Pivot pin 19 and valve plate 20 can be integrally cast as is illustrated in the embodiment shown in FIG. 7. When valving member 18 is properly placed within recess 23 of removable seat 16, valving member 18 will pivot about the central axis of pivot pin 19.

Retainer 30 is provided to hold both valve seat 16 and valve member 18 in their proper position within body 12. As can best be seen by FIG. 1, retainer 30 is substantially arcuate in shape, corresponding to the shape generally of removable seat 16, but providing a central opening 31 which allows valving member 18 to pivot to an openmost or to a closed position depending on the direction of flow through openings 14, 17.

It can be seen by one skilled in the art, that retainer 30 allows proper pivotal action of valving member 18, but does not allow valving member 18 to leave its position within recess 23, as the tip portions 19a, 19b of valve pivot pin 19 will be retained by retainer 30.

Check valve 10 is assembled by placing valving member 18 into recess 23 with projection 27 facing opening 17, the valve closure plate 20 abutting O-ring 26. It can be seen that when sufficient back pressure is applied to valve member 18, a substantially fluid tight closure will be effected between valve plate 20 and O-ring 26, disallowing the flow of fluids in the undesirable direction.

Removable seat 16 and its contained valving member 18 are inserted into recess 13, such that mounting holes 40, 24 coincide, and likewise there is a coincidence between fluid openings 14, 17. When removable seat 16 and its contained valving member 18 are thus positioned within recess 13 of body 12, retainer 30 is placed in a likewise corresponding position with openings 32 aligning with the bolt openings 40, 24 of body 12 and seat 16 respectively. When body 12, seat 16, and retainer 30 are so aligned, mounting bolts 35, 35a can easily pass through openings 32, 24, and 40. Openings 40 on body 12 will preferably be threaded, so that an engagement of mounting bolts 35 threadably therein will firmly secure seat 16 and retainer 30 into recess 13 of body 12 as is desirable. In this position, valving member 18 is allowed to pivot about pin 19 within recess 23, to an either open or closed position.

Retainer 30 can be provided with stop 33. Stop 33 regulates the degrees of opening of valving member 18. It can be seen by one skilled in the art, that upon the pivot of valve member 18 to its openmost position, valve member 18 will eventually abut stop 33 halting its pivotal opening. It is desirable that valving member 18 not pivot a distance which will allow it to go beyond an angular degree opening of ninety degrees. When undesirable backflow occurs, the valve will be caught by the force of the moving fluid and forced through a closure position with face 20 abutting O-ring 26. If valving member is open a measure of degrees greater than ninety degrees, it could possibly be urged to open rather than to close by the fluid rushing through opening 17 in the undesirable direction. However, if valving member 18 is open a measure of degrees less than ninety degrees during backflow, the valving member will always receive pressure from the flowing stream on its upstream face opposite closure plate 20 and projection 27, thus forcing the valve to close no matter what the overall orientation of valve body 12. Closure spring 28, mounted on bracket 28a by pin 29, can be provided to enhance the positive closure of valving member 18 during undesirable backflow conditions or static flow conditions. Bracket 28a can be secured by mounting bolt 35a.

In the preferred embodiment, check valve 10 would normally be mounted so that pivot pin 19 is at the uppermost elevation of the recess 13, thus adding gravitational pull to the closure force acting on valving member 18. It should be understood however, that valve 10 of the present invention will close no matter what is the orientation of the valve, since the backflow of fluids alone is sufficient to effect a proper closure of valving member 18 against O-ring 26 and opening 17.

OPERATION

In operation, check valve 10 can be inserted in any fluid line or flow line wherein it is desired to halt the flow of fluid in one direction. Normally, the weight of valving member 18 and/or the spring capacity of closure spring 28 will determine how much fluid pressure is necessary to hold the valve in an open position when flow is in the normal direction.

When fluid flow is in an undesirable or backflow direction, fluid will strike the closure plate 20 portion of valving member 18, forcing the valve to shut as described more fully above.

The valve can be used in any number of situations, with a plurality of varying fluids such as slurries, oil, gases, water, and the like.

The device would be especially useful wherein the flowing fluids contain abrasive substances which would normally wear out seat 16 within a relatively short period of time. Such fluids are for example experienced in the drilling of oil and gas wells where sand and other abrasives often mix with the desired fluid product being transmitted.

Seat 16 can be easily removed and replaced and/or repaired by simply disengaging mounting bolts 35, 35a from their respective holes 22 in valve body 12.

Valve body 12 can be of any suitable valve material, such as cast iron, steel, aluminum or the like.

The inner valving portions which would receive the greatest amount of wear would be removable seat 16, valving member 18, and retainer 30. These parts could be manufactured of any suitable high quality and abrasive resistant material such as stainless steel, cast iron, cast aluminum or the like. These parts could be kept in "inventory" and easily replaced "on-site" by merely removing mounting bolts 35 as was discussed more fully above.

Thus, the present invention provides a check valve which is simple in operation, and easily maintainable with a minimum amount of labor involved. The device provides a removable seat 16 which can be quickly and easily replaced or repaired, seat 16 being the part of check valve 10 which is most susceptible to abrasive wear, especially in the oil and gas field where sand and like abrasives can become mixed with the fluid being transmitted.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. A pipeline check valve, comprising:
   a. a valve body provided with a recess, said valve body having a flow opening therethrough communicating with said recess;
   b. a removable valve seat, said valve seat provided with a fluid opening therethrough, said valve seat corresponding to said recess and being attachable to said valve body within said recess with said flow opening of said body and said fluid opening of said seat aligning to allow fluid flow through said aligned openings;
   c. a valving member in operative connection with said valve seat, said valving member being capable of effecting a substantially fluid tight seal with said fluid opening in said valve seat when fluid flows through said opening of said valve seat in a backflow direction; and
   d. temporary attachment means for securing said removable valve seat to said valve body, said attachment means comprising:
      i. a plurality of openings in said valve seat;
      ii. a corresponding plurality of aligning openings in said valve body;
      iii. at least one mounting bolt inserted through said aligned openings connecting said valve seat with said valve body; and
      iv. a retainer member being entirely attached during operation to said removable valve seat on the downstream face side thereof, with said valving member occupying a pivotal position during operation between said retainer member and said valve seat, said retainer providing a plurality of openings corresponding to and aligning during operation with said plurality of openings provided in said valve body and through said valve seat.

2. The check valve of claim 1, further comprising a spring member on said valve for urging said valving member into a closed sealing position on said valve seat when fluid flow is in a static flow condition.

3. The check valve of claim 1, wherein said valve seat is cylindrical and provided with a pair of parallel faces, and on one face portion there is provided a valve recess, and said valve recess accepts said valving member thereinto and said valving member is provided with a pivot pin, and a portion of said recess is adapted to receive said pivot pin, and said valving member pivots about said pin allowing operation of said valving member.

4. A pipeline check valve comprising:
   a. a cylindrical valve body provided with a cylindrical valve seat recess and a flow opening therethrough at said seat recess;
   b. a removable cylindrical valve seat, said valve seat being provided with a fluid opening therethrough, there being further provided on said valve seat a valving member recess;
   c. a valving member provided with an attached pivot pin in operative connection with said valve seat at said valving member recess, said valving member being capable of effecting a substantially fluid tight seal with said fluid opening of said valve seat when fluid flows through said opening of said valve seat in a backflow direction, said valving member recess being generally circular, there being provided an elongated straight portion adjacent but continuous with the circular portion of said valving member recess, said straight portion adapted to receive said pivot pin of said valving member, there being provided a plurality of aligning holes through said valve seat and said valve body, respectively:
   d. temporary attachment means for securing said removable valve seat to said valve body, said temporary attachment means comprising:
      i. a plurality of openings in said valve seat;
      ii. a corresponding plurality of aligning openings in said valve body;
      iii. at least one mounting bolt inserted through said aligned openings connecting said valve seat with said valve body; and
      iv. a retainer member being entirely attached during operation to said removable valve seat on the downstream face side thereof, with said valving member occupying a pivotal position during operation between said retainer member and said valve seat, said retainer providing a plurality of openings corresponding to and aligning during operation with said plurality of openings provided in said valve body and through said valve seat;
   e. means for urging said valving member into a closed sealed position on said valve seat when said fluid flow is in a static flow condition.

5. The valve of claim 4 wherein said flow opening of said valve body is of a smaller diameter than said fluid opening of said removable valve seat, causing said valve body to absorb the initial wear from the fluid flow through the check valve.

6. A pipeline check valve and removable valve seat apparatus comprising:
   a. a cylindrical valve body providing upstream and downstream face portions with a valve seat recess provided at and extending into the central portion of said downstream face, said recess adapted to protectively house a removable valve seat, said valve body having a flow opening therethrough communicating with said valve seat recess;
   b. a removable cylindrical valve seat smaller in diameter than said valve body and being adapted for registering placement with and connection to said valve seat recess, said valve seat having a fluid opening therethrough in general fluid communication with said flow opening of said valve body, there being further provided on said valve seat a flap valve recess adapted to sealably and movably receive a flap valve, said flap valve recess being located on said removable valve seat on the downstream face thereof;

c. a flap valving member movably mounted entirely on said valve seat at said flap valve recess, said flap valving member forming a pivotal connection with said flap valve recess, said valving member sealing entirely against said valve seat in backflow conditions;

d. means on said removable valve seat for urging said flap valving member into a closed sealed position on said valve seat when the fluid flow is in a static flow condition; and e. temporary attachment means for securing said removable valve seat in said valve seat recess of said valve body, said seat and said flap valving member being removably replaceable from said valve body, said temporary attachment attachment means comprising a plurality of openings in said valve seat and a corresponding plurality of aligning openings in said valve body, and at least one mounting bolt inserted through said aligned holes connecting said valve seat with said valve body, and f. a generally u-shaped retainer member being entirely attached during operation to said removable valve seat on the downstream face side thereof, with said valve flap member occupying a pivotal movable position during operation between said retainer member and said valve seat and said retainer has a plurality of openings corresponding to and aligning during operation with the plurality of openings provided in said valve body and through said valve seat.

* * * * *